UNITED STATES PATENT OFFICE 2,118,386

HYDROFLUORIC ACID COMPOSITION

Carl F. Swinehart, Cleveland, Ohio, assignor to The Harshaw Chemical Company, Elyria, Ohio, a corporation of Ohio No Drawing. Application December 27, 1933, Serial No. 704,208. Renewed May 4, 1937

11 Claims. (Cl. 41—42)

The generation and application of hydrofluoric acid for action upon glass surfaces to produce a frosted effect has long been known, and it has been customary to make up a solution of hydrofluoric acid of high concentration with ammonium bifluoride, ammonium carbonate, and sal soda, and employ such bath as a means for applying the hydrofluoric acid. If the conditions are just right, acceptable frost-finish is attained, but such solution is difficult to prepare, and after it is put into use is continually changing in composition, and the results tend to vary considerably from uniformity. In addition, in the making up of this solution, there is considerable gas generation and spattering of the liquid, with attendant hazards to workmen and damage to unprotected shop-environment. Even after having been made up, the solution must be allowed to stand or be aged from 16 to 38 hours, depending upon conditions, before it can be used. In use, the accumulations resulting from chemical action on the glass which is treated, occasion deterioration in the bath and require careful attention and correction. In accordance with the present invention, hydrofluoric acid control now becomes possible in a form simple of application and accurate in results, and without undue hazards.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, ammonium bifluoride, $NH_4HF_2$ is made up in dry mixture with a pulverulent material such as starch or equivalent, as very finely divided wood flour, insoluble inorganic compounds such as compounds of barium, calcium lead, etc., for instance barium sulphate, calcium fluoride, calcium sulphate, lead fluoride, lead chromate, etc. Such finely divided or pulverulent material presents an advantage in composition by, among other things, providing grain-points of surface generation or anchorage of silicofluorides when the composition is ultimately brought into contact with glass surfaces, and for want of a better term, I may arbitrarily designate such starch or equivalents as a pulverulent crystal-nidus agent. Of such finely divided materials, corn starch is particularly desirable, and rice starch, wheat starch, potato starch, etc. may also be employed, the inorganic materials also being somewhat less desirable on account of a tendency to give a more dead white result than is the case with the preferred materials. In some instances, the ammonium bifluoride may be substituted in whole or in part by other fluorides, such as potassium bifluoride, cobalt bifluoride, tetra-methyl ammonium bifluoride, tri-methyl ammonium bifluoride, and the like, the ammonium bifluoride ordinarily being preferable.

The bifluoride and starch or other finely divided or pulverulent materials are thoroughly mixed together dry, grinding if necessary, the amounts of ammonium bifluoride ranging for example from 50 to 70 per cent, and the starch or the like from 15 to 50 per cent.

The dry mixture of fluoride and finely divided agent is incorporated at the time of use, in a solution of hydrofluoric acid which may range from 15 to 60 per cent concentration, usually 20-40 per cent. The hydrofluoric acid bath thus prepared may be applied to the glass surfaces to be treated, in any desired manner, for instance by spraying or dipping, and an exposure of 30 seconds to 1 minute is ordinarily sufficient for the action, whereupon the article may be rinsed off with water.

In some cases I may add sodium bifluoride, $NaHF_2$, to the mixture of ammonium bifluoride and pulverulent material, the compound in such case again being a dry powder which can be stored or handled as such until required for use. The amount of sodium bifluoride when so employed may range from 15–50 per cent. Such composition tends to operate even more uniformly and is advantageous where large surfaces are being treated. In some cases also, I may add up to 10 per cent, and preferably about 5 per cent, of a fluosilicate, such for instance as magnesium fluosilicate, ammonium fluosilicate, sodium fluosilicate, calcium fluosilicate, copper fluosilicate, cobalt fluosilicate, etc. This is of advantage where more shine or sparkle in the finish is desired. As a further addition desirable in many instances, there may also be incorporated with the ammonium bifluoride and dry powdered material, with or without the additional ingredients, a surface tension reducing agent, such for instance as $\frac{1}{20}$ to 1 per cent of a sulphonated naphthalene, or a salt of a sulphated higher alcohol such for instance as $C_{12}H_{25}SO_4Na$ and higher homologs, or saponin, or as much as about 2 per cent of soap bark in finely divided condition. The ammonium bifluoride and pulverulent crystal-nidus agent, with or without such of the above-mentioned other ingredients as desired, as sodium bifluoride, metallic fluosilicates and surface tension reducing agents, makes up in all cases conveniently as a dry powder material capable of being handled and stored conveniently until required to be finally made up with the hydrofluoric acid in solution. Depending upon whether more or less hydrofluoric acid is used, the frosting effect may be varied somewhat. About 40 per cent concentration of hydrofluoric acid is a desirable upper limit for attractive satin finishes. Above such concentration the finish tends more to a dead white.

The following examples may be noted as illustrative of compounds in accordance with the invention:—

I. Ammonium bifluoride about 55 parts, by weight, sodium bifluoride about 27 parts, and corn starch about 18 parts are intimately mixed together, with grinding. The dry compound may be conveniently stored and handled in such form. For usage, this compound is admixed with desirably a 20 per cent to 40 per cent solution of hydrofluoric acid.

II. About 50 parts, by weight, of ammonium bifluoride, about 12 parts of sodium bifluoride, about 33 parts of corn starch and about 5 parts of magnesium fluosilicate are thoroughly mixed together to a dry powdered product, which is mixed with hydrofluoric acid solution, for use, the strength of the acid being desirably 20–40 per cent.

III. About 50 parts, by weight, of ammonium bifluoride, about 12 parts of sodium bifluoride, about 33 parts of corn starch, about 5 parts of magnesium fluosilicate, and about 1 part of sulphonated naphthalene are thoroughly mixed together to a dry powdered product, which is mixed with hydrofluoric acid solution, for use, the strength of the acid being desirably 20–40 per cent.

The precise results in frosting may be varied somewhat in accordance with the proportions of the dry mixture and the hydrofluoric acid solution employed, and in general more of the dry mixture is desirable with weaker concentrations of hydrofluoric acid solution. Thus, for 100 parts of acid, by weight, where employing a 40 per cent concentration, it is desirable to admix about 95–120 parts of the dry mixture as illustrated in Example II, while for the same weight of 30 per cent acid, it is desirable to employ 110–120 parts of the dry mixture.

Other modes of applying the principle of the invention may be employed, change being made as regards the details described, provided the features stated in any of the following claims, or the equivalent of such, be employed.

I therefore particularly point out and distinctly claim as my invention:—

1. As a new article of manufacture, a dry stable powder etching composition comprising at least fifteen percent of a pulverulent crystal-nidus agent, and a larger percentage of ammonium bifluoride.

2. As a new article of manufacture, a dry stable powder etching composition comprising at least fifteen percent of a pulverulent crystal-nidus agent, and a larger percentage of ammonium bifluoride together with sodium bifluoride in amount at least fifteen percent.

3. As a new article of manufacture, a dry stable powder etching composition comprising at least fifteen percent of a pulverulent crystal-nidus agent, and a larger percentage of ammonium bifluoride, together with sodium bifluoride and a soluble fluosilicate in amounts less than the ammonium bifluoride.

4. As a new etching composition, a dry stable powder, comprising ammonium bifluoride with fifteen to fifty per cent of a pulverulent crystal-nidus agent proportioned on dry basis, and a small amount of an agent effective in the etching bath to reduce surface tension and thereby lessen bath losses as carried out on the articles etched.

5. As a new article of manufacture, a dry stable powder etching composition comprising at least fifteen percent of a pulverulent crystal-nidus agent, and a larger percentage of ammonium bifluoride, together with a sulphonated naphthalene.

6. A process of making an etching composition, which comprises dry-grinding together ammonium bifluoride, sodium bifluoride, and pulverulent starch, and maintaining the mass in dry powdered form until ready for using.

7. A process of making an etching composition, which comprises dry-grinding together ammonium bifluoride, a soluble fluosilicate and pulverulent starch, and maintaining the mass in dry powdered form until ready for using.

8. A process of making an etching composition, which comprises dry-grinding together ammonium bifluoride and a soluble fluosilicate with fifteen to fifty per cent of pulverulent starch, and a small amount of a surface tension reducing agent, and maintaining the mass in dry powdered form until ready for using.

9. A process of making an etching composition, which comprises dry-grinding together ammonium bifluoride, sodium bifluoride, a soluble fluosilicate, a naphthalene sulphonate, and pulverulent starch, and maintaining the mass in dry powdered form until ready for using.

10. As a new article of manufacture, a dry stable powder etching composition comprising at least fifteen percent of a pulverulent crystal-nidus agent, and a larger percentage of a bifluoride from the group consisting of ammonium bifluoride, potassium bifluoride, tetra-methyl ammonium bifluoride and tri-methyl ammonium bifluoride.

11. As a new article of manufacture, a dry stable powder etching composition comprising at least fifteen percent of a pulverulent crystal-nidus agent, and a larger percentage of potassium bifluoride.

CARL F. SWINEHART.